United States Patent
Jairath

(10) Patent No.: US 7,424,721 B2
(45) Date of Patent: Sep. 9, 2008

(54) INTER-OBJECT COMMUNICATION INTERFACE BRIDGE

(75) Inventor: Pankaj Jairath, New Delhi (IN)

(73) Assignee: Sun Microsystems, Inc., Santa Clara, CA (US)

(*) Notice: Subject to any disclaimer, the term of this patent is extended or adjusted under 35 U.S.C. 154(b) by 902 days.

(21) Appl. No.: 10/440,599

(22) Filed: May 19, 2003

(65) Prior Publication Data

US 2004/0237092 A1 Nov. 25, 2004

(51) Int. Cl.
*G06F 9/44* (2006.01)

(52) U.S. Cl. .................. 719/330; 719/316; 719/328

(58) Field of Classification Search ............ 709/203, 709/228, 219, 28; 719/310, 330, 315, 316, 719/328; 707/10, 102
See application file for complete search history.

(56) References Cited

U.S. PATENT DOCUMENTS

| | | | |
|---|---|---|---|
| 5,862,328 A * | 1/1999 | Colyer | 709/203 |
| 6,185,695 B1 | 2/2001 | Murphy et al. | |
| 6,591,272 B1 * | 7/2003 | Williams | 707/102 |
| 6,640,249 B1 * | 10/2003 | Bowman-Amuah | 709/228 |
| 6,643,652 B2 * | 11/2003 | Helgeson et al. | 707/10 |
| 6,715,145 B1 * | 3/2004 | Bowman-Amuah | 718/101 |
| 6,886,041 B2 * | 4/2005 | Messinger et al. | 709/226 |
| 6,959,307 B2 * | 10/2005 | Apte | 707/104.1 |
| 7,072,934 B2 * | 7/2006 | Helgeson et al. | 709/203 |
| 7,136,857 B2 * | 11/2006 | Chen et al. | 707/10 |
| 7,209,921 B2 * | 4/2007 | Pace et al. | 707/10 |
| 2002/0099970 A1 | 7/2002 | Zhao et al. | |
| 2003/0058277 A1 * | 3/2003 | Bowman-Amuah | 715/765 |
| 2005/0238006 A1 | 10/2005 | Taylor et al. | |
| 2005/0240840 A1 | 10/2005 | Taylor et al. | |

OTHER PUBLICATIONS

"Java to IDL Language Mapping Specification," Version 1.3, Sep. 22, 2003.
"Java Naming and Directory Interface Application Programming Interface (JNDI API)," Sun Microsystems, Jul. 14, 1999.
Java Naming and Directory Interface Service Provider Interface (JNDI SPI), Sun Microsystems, Jul. 14, 1999.
"Enabling Support for Corba-Based Clients," Chapter 10, iPlanet, Nov. 25, 2002, 9 pages.
U.S. Appl. No. 10/919,049, filed Aug. 16, 2004.
Salil Deshpande, "Clustering: Transparent Replication, Load Balancing, and Failover; Building Scalable and Highly Available E-Commerce Applications with Borland AppServer," Jan. 2000, CustomWare, pp. 1-22.

* cited by examiner

*Primary Examiner*—Van H Nguyen
(74) *Attorney, Agent, or Firm*—Robert C Kowert; Meyertons, Hood, Kivlin, Kowert & Goetzel, P.C.

(57) ABSTRACT

System and method for bridging between inter-object communication interfaces, such as RMI and IIOP, may include in one embodiment a bridge mechanism that maintains a cache of reference objects. The key used for hashing in the cache may be based on the object identifier (OID) of the reference objects. In one embodiment, the integer value of the OID is generated and then converted to a string for use in caching the object. In one embodiment, objects are not marked for deletion from the cache until a client calls a remove method. In one embodiment, object references in the cache include a reference to an exported object. In one embodiment, unexport of the exported object is performed by a post-invoke mechanism of the bridge mechanism after the remove method has completed.

105 Claims, 8 Drawing Sheets

INTER-OBJECT COMMUNICATION INTERFACE BRIDGE

BACKGROUND

1. Field of the Invention

This invention relates to network computing, and more particularly to bridge processes between inter-object communication interfaces, such as CORBA and RMI.

2. Description of the Related Art

RMI (Remote Method Invocation) is a way that a programmer, using the Java programming language and development environment, can write object-oriented programming in which objects on different computers can interact in a distributed network. RMI is the Java version of what is generally known as a remote procedure call (RPC), but with the ability to pass one or more objects along with the request. The object can include information that will change the service that is performed in the remote computer. The object parameter-passing mechanism may be referred to as object serialization. An RMI request is a request to invoke the method of a remote object. The request has the same syntax as a request to invoke an object method in the same (local) computer. In general, RMI is designed to preserve the object model and its advantages across a network.

RMI is implemented as three layers:

A stub (proxy) program in the client side of the client/server relationship, and a corresponding skeleton at the server end. The stub appears to the calling program to be the program being called for a service.

A Remote Reference Layer that can behave differently depending on the parameters passed by the calling program. For example, this layer can determine whether the request is to call a single remote service or multiple remote programs as in a multicast.

A Transport Connection Layer, which sets up and manages the request.

A single request travels down through the layers on one computer and up through the layers at the other end.

IIOP (Internet Inter-ORB Protocol) is a protocol that makes it possible for distributed programs written in different programming languages to communicate over the Internet. IIOP is a critical part of a strategic industry standard, the Common Object Request Broker Architecture (CORBA). CORBA is an architecture and specification for creating, distributing, and managing distributed program objects in a network. It allows programs at different locations and developed by different vendors to communicate in a network through an "interface broker."

An essential concept in CORBA is the Object Request Broker (ORB). An Object Request Broker (ORB) is the programming that acts as a "broker" between a client request for a service from a distributed object or component and the completion of that request. Having ORB support in a network means that a client program can request a service without having to understand where the server is in a distributed network or exactly what the interface to the server program looks like. Components can find out about each other and exchange interface information as they are running.

ORB support in a network of clients and servers on different computers means that a client program (which may itself be an object) can request services from a server program or object without having to understand where the server is in a distributed network or what the interface to the server program looks like. To make requests or return replies between the ORBs, programs use the General Inter-ORB Protocol (GIOP) and, for the Internet, Internet Inter-ORB Protocol (IIOP). IIOP maps GIOP requests and replies to the Internet's Transmission Control Protocol (TCP) layer in each computer.

Using CORBA's IIOP and related protocols, a company can write programs that will be able to communicate with their own or other company's existing or future programs wherever they are located and without having to understand anything about the program other than its service and a name.

CORBA and IIOP assume the client/server model of computing in which a client program always makes requests and a server program waits to receive requests from clients. When writing a program, an interface is used called the General Inter-ORB Protocol (GIOP). The GIOP is implemented in specialized mappings for one or more network transport layers. An important specialized mapping of GIOP is IIOP, which passes requests or receives replies through the Internet's transport layer using the Transmission Control Protocol (TCP). Other possible transport layers include IBM's Systems Network Architecture (SNA) and Novell's IPX.

An object adapter is a sub component in ORB that connects a request using an object reference with the proper code to service that request. The Portable Object Adapter, or POA, is a particular type of object adapter that is defined by the CORBA specification. The POA is designed to meet the following goals:

Allow programmers to construct object implementations that are portable between different ORB products.

Provide support for objects with persistent identities.

Provide support for transparent activation of objects.

Allow a single servant to support multiple object identities simultaneously.

A POA object manages the implementation of a collection of objects. The POA supports a name space for the objects, which are identified by Object IDs. A POA also provides a name space for POAs. A POA is created as a child of an existing POA, which forms a hierarchy starting with the root POA.

Enterprise JavaBeans (EJB) is an architecture for setting up program components, written in the Java programming language, that run in the server parts of a computer network that uses the client/server model. Enterprise JavaBeans is built on the JavaBeans technology for distributing program components (which are called Beans) to clients in a network. Enterprise JavaBeans offers enterprises the advantage of being able to control change at the server rather than having to update each individual computer with a client whenever a new program component is changed or added. EJB components have the advantage of being reusable in multiple applications. To deploy an EJB Bean or component, it must be part of a specific application, which is called a container.

EJB's program components are generally known as servlets (little server programs). The application or container that runs the servlets is sometimes called an application server. A typical use of servlets is to replace Web programs that use the common gateway interface (CGI) and a Practical Extraction and Reporting Language script. Another general use is to provide an interface between Web users and a legacy application mainframe application and its database. In Enterprise JavaBeans, there are two types of beans: session beans and entity beans. An entity bean is described as one that, unlike a session bean, has persistence and can retain its original behavior or state.

SUMMARY

Embodiments of a system and method for a bridge process between inter-object communication interfaces such as RMI and CORBA are described. In one embodiment, a bridge mechanism may be implemented in an application server to provide support for RMI over IIOP communication for deployed beans. One or more rich clients may connect to the bridge mechanism when looking up and invoking operations over the deployed beans. The application server may provide one or more Java server engines that provide container implementations for beans (e.g. EJB beans). In one embodiment, the bridge mechanism uses the Tie CORBA object implementation mechanism to provide RMI over IIOP support. In one embodiment, the Tie CORBA object(s) delegate calls to intermediate bridge object implementation(s), which in turn delegate the calls to delegate objects to communicate with the bean objects on the container(s). In one embodiment, the delegate objects may use a proprietary communication protocol.

The servant locator maintains an internal cache of objects previously requested by rich clients and stored in accordance with hashes of the OIDs of the objects. If an object is being located, or if a new object is being created, the object is added to the cache.

In one embodiment, a bridge mechanism maintains a cache of CORBA references. If a CORBA object is being located, or if a new CORBA object is being created, the CORBA object may be added to the cache. The key used for hashing in the cache is the object identifier (OID) of the CORBA reference objects. OID representation is in the form of a byte array. The bridge mechanism first generates the integer value of the OID, and then converts the obtained integer value to its string representation, thereby maintaining the uniqueness of the ODs in the internal cache and preventing overwriting of cached CORBA references.

In one embodiment, the bridge mechanism includes a servant locator that provides a pre-invoke and a post-invoke operation. RMI/IIOP calls from rich clients to the bridge mechanism go to a Portable Object Adapter (POA) object of the bridge. The POA object sends the calls to the servant locator to get CORBA objects (delegates) to call the target objects (beans). The calls sent to the servant locator go to the pre-invoke mechanism, and, after pre-invoke finishes, the actual remote objects on containers are called. Once the call to the final target object completes, and before the call is returned to the client, the post-invoke mechanism of the servant locator is invoked by the POA.

In one embodiment, objects are not marked for deletion from the cache until the rich client has actually called the remove method. In one embodiment, the rich clients are required to call the remove method when done with an object. Requiring the rich clients to call the remove method when done with an object may help prevent the cache from potentially growing beyond boundary conditions. When post-invoke is called, it checks to see if the call is a remove method. If it a remove call, post-invoke marks the object for deletion from the cache. If the call is not a remove call, the object is not marked for deletion from the cache.

In one embodiment, CORBA references stored in the cache include a target object that is an RMI portable remote object. This RMI portable remote object is exported when instantiated. In one embodiment, to insure that the target of the CORBA reference is available to the post-invoke mechanism, unexport is not performed as part of the remove method implementation of the bridge mechanism. Upon invocation of post-invoke method, after the remove method returns, the servant locator removes the cached CORBA reference. During removal from the cache, the target of the CORBA reference is unexported and set to null, thus ensuring that all the associated object references (related to the invocation object) held by the bridge mechanism, CORBA objects and their targets, are removed.

Figure 1:
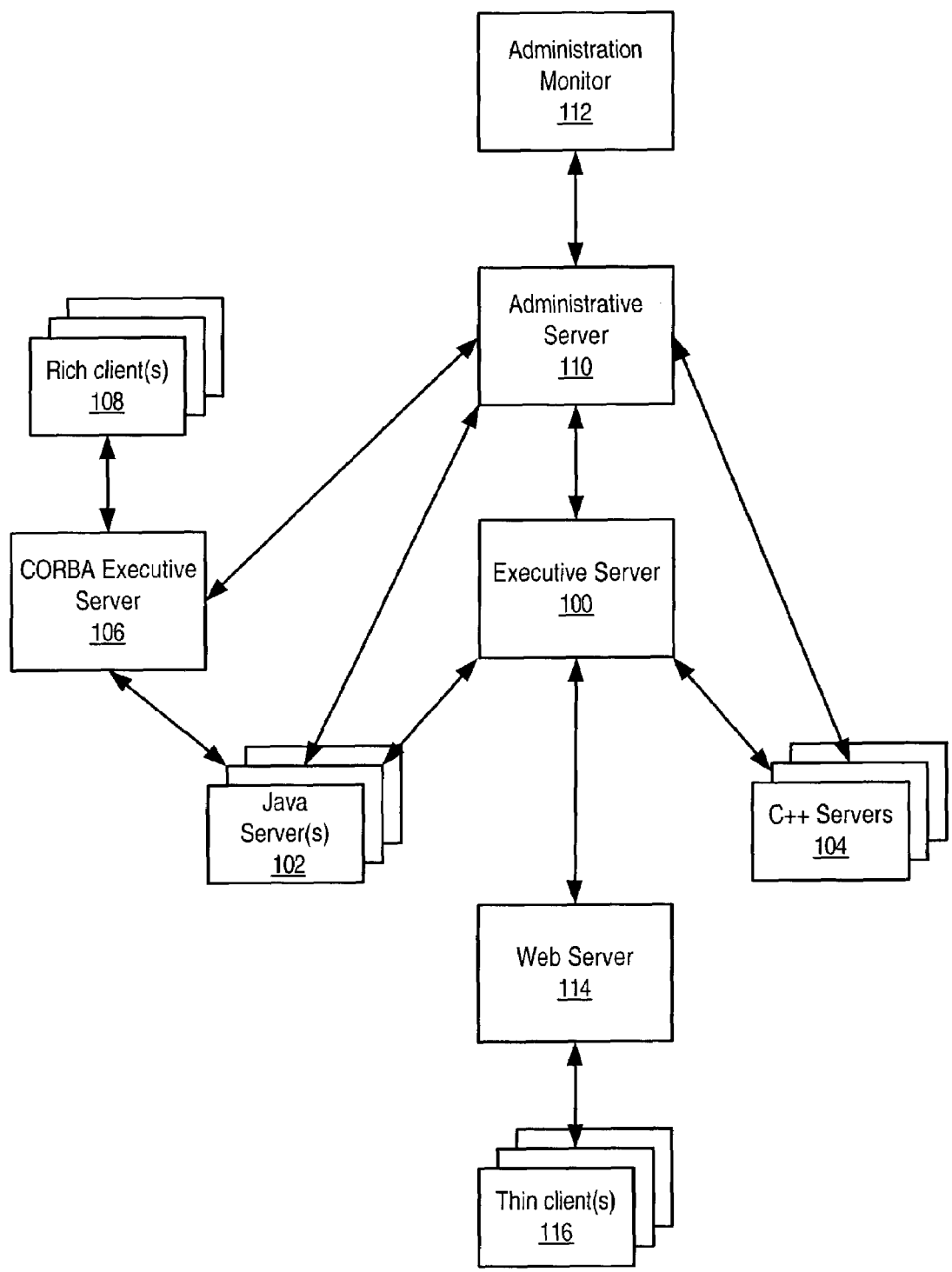
FIG. 1 illustrates server processes running under an application server according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for a bridge process between inter-object communication interfaces are described. An inter-object communication interface may be defined as an interface through which objects can interact in a distributed system. Exemplary inter-object communication interfaces may include, but are not limited to, Remote Method Invocation (RMI), Common Object Request Broker Architecture (CORBA), Distributed Computing Environment (DCE), Component Object Model (COM), Distributed Component Object Model (DCOM), System Object Model (SOM), Distributed System Object Model (DSOM), Remote Procedure Call (RPC), and Microsoft's Component Object Model (COM) and Distributed Component Object Model (DCOM). In this document, embodiments of the bridge process or mechanism are generally described as bridges between CORBA clients and RMI objects, but it is to be understood that other embodiments may provide bridge mechanisms between either RMI or CORBA and other inter-object communication interfaces or alternatively between two other inter-object communication interfaces. Thus, in this description and in the drawings, where CORBA and/or RMI is used, it is to be understood that other inter-object communication interfaces may be substituted for one or both of CORBA and RMI.

In one embodiment, CORBA client support in an application server including RMI objects may be provided through a bridge process or mechanism that may be referred to as the CORBA Executive Server. The CORBA Executive Server acts as a bridge between Java and/or C++ clients using IIOP and EJBs deployed to one or more Java Engines acting as EJB containers. For every EJB accessed by CORBA clients, the IIOP bridge process handles the incoming IIOP-based requests and maps these requests to internal calls to EJBs housed within the EJB containers.

FIG. 1 illustrates server processes running under an application server according to one embodiment. The executive server 100 performs general application server functions, such as managing memory, queuing client requests, and routing requests to appropriate server processes. The Java Server(s) 102 hosts application elements written in Java and the C++ server(s) 104 hosts components written in C++. In addition, the CORBA Executive Server 106 serves as a bridge that allows for independent clients (rich clients 108) to communicate with Enterprise JavaBeans (EJBs) hosted on Java Server(s) 102. The Administrative Server 110 monitors the other application server processes and acts as a server for the administrative and deployment tools.

Multiple Java server 102 processes may be added to handle Java applications. This may be done, for example, when a Java Server is overloaded. The Executive Server process 100 may automatically load-balance requests when there are multiple processes handling the same types of requests.

In one embodiment, an application server may support access to EJBs via the IIOP protocol, for example as specified in the Enterprise JavaBeans Specification and the Enterprise JavaBeans to CORBA Mapping specification. These clients may use JNDI to locate EJBs and use Java RMI/IIOP to access business methods of remote EJBs, or alternatively may use C++ with IIOP to access business methods of remote EJBs. Scenarios in which CORBA clients are employed may include when either a stand-alone program or another application server acts as a client to EJBs deployed to an application server.

Figure 2A:
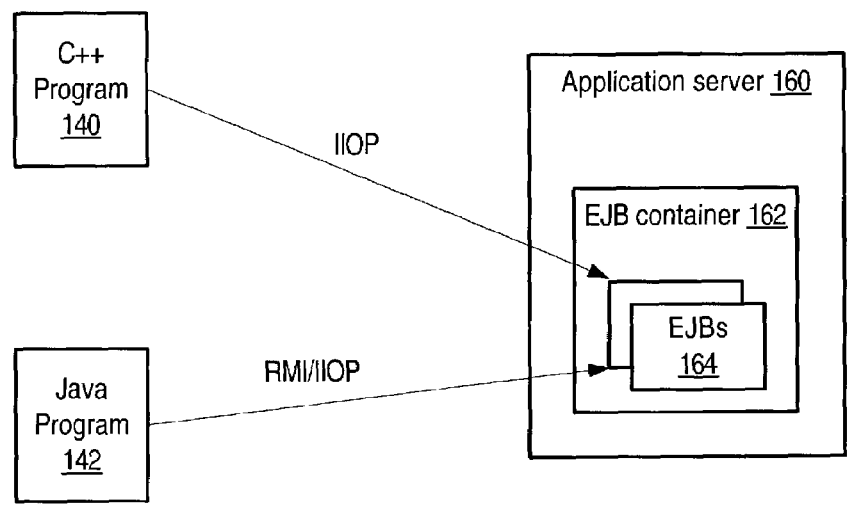
FIG. 2A illustrates stand-alone programs as clients according to one embodiment.

FIG. 2A illustrates stand-alone programs as clients according to one embodiment. In this embodiment, a stand-alone program, such as C++ program 140 and Java program 142, which may run on a variety of operating systems, may use IIOP to access business logic housed in back-end EJB components 164 in an EJB container 162 hosted on application server 160.

Figure 2B:
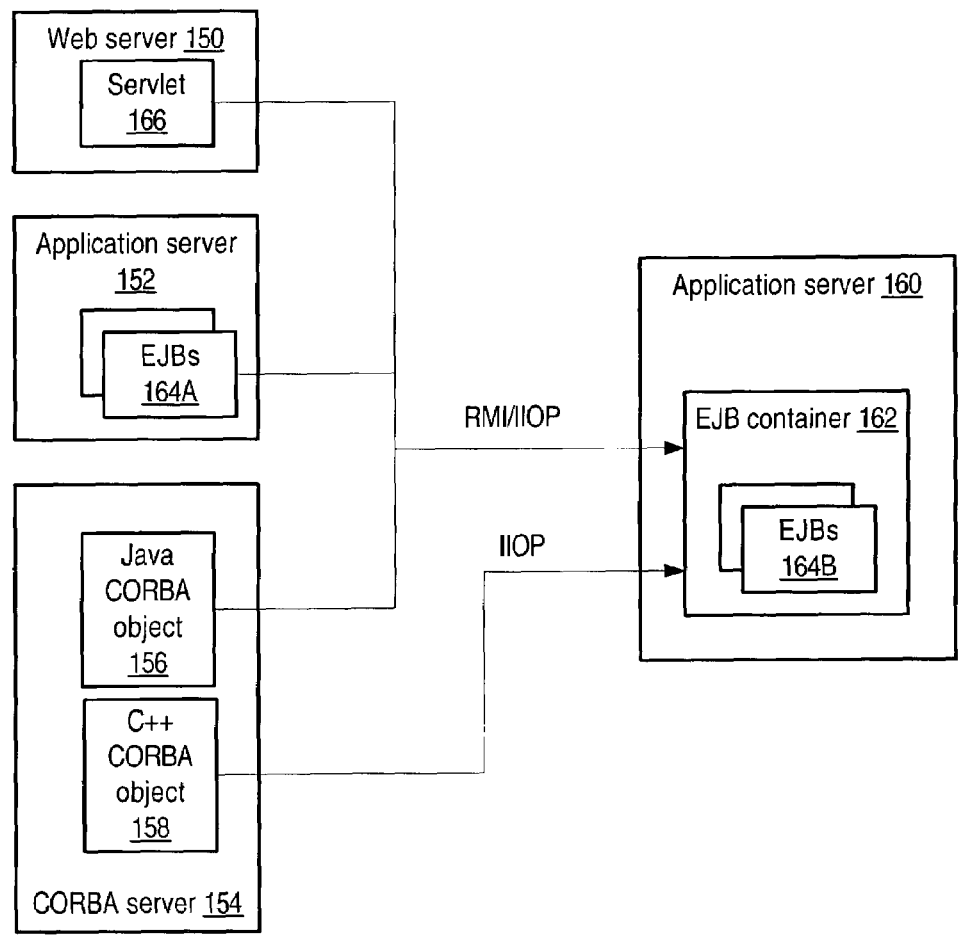
FIG. 2B illustrates IIOP in an application server environment according to one embodiment.

FIG. 2B illustrates IIOP in an application server environment according to one embodiment. Web servers 150, CORBA objects (e.g. Java CORBA objects 156 and C++ CORBA objects 158 hosted on CORBA server 154), and other application servers 152 may use IIOP to access EJBs 164B hosted on application server 160.

In one embodiment, an application server may be unable to work directly with CORBA applications such as rich clients because the application server does not directly support CORBA objects. Objects created on containers of the application server are not CORBA objects but RMI objects. In one embodiment, to enable rich client access to the containers and RMI objects, the application server may provide an interface in line with CORBA standards, thus providing CORBA interfaces to rich clients. In one embodiment, this interface may be implemented as an intermediate or bridge process, which may be referred to as a bridge mechanism. The bridge mechanism may provide the CORBA interfaces that enable CORBA rich clients to communicate with the RMI objects of the container.

Figure 3:
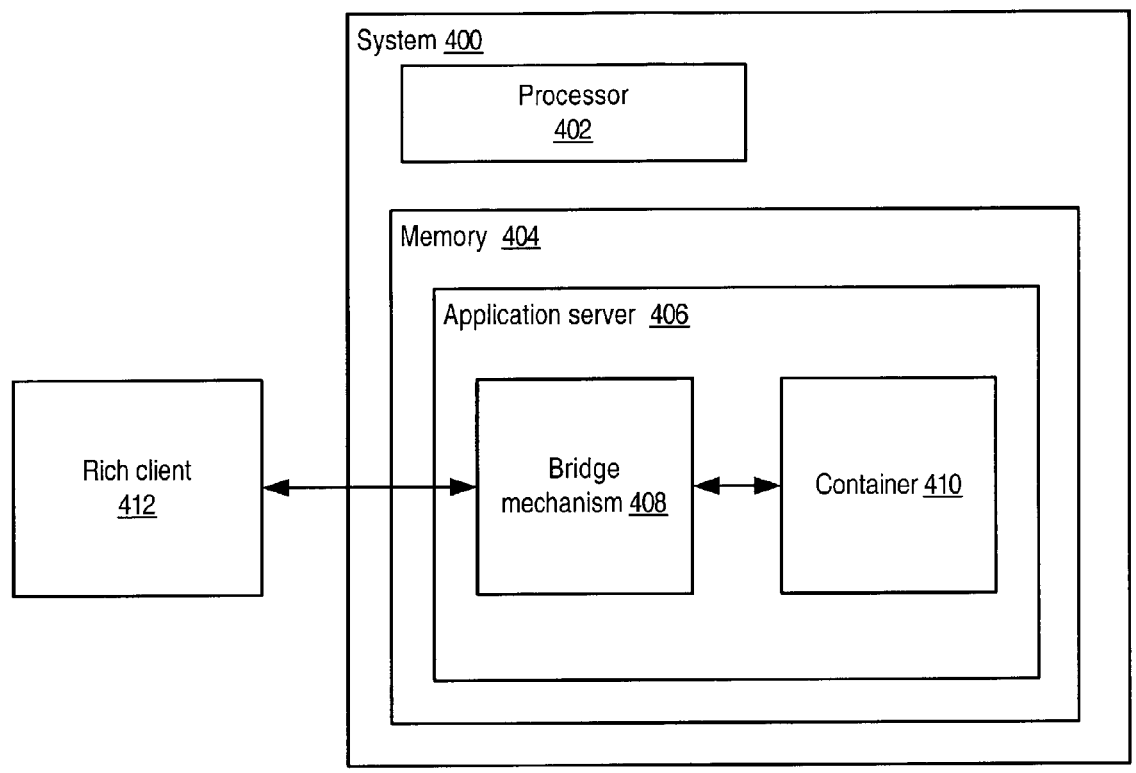
FIG. 3 illustrates a system implementing an application server including a bridge according to one embodiment.

FIG. 3 illustrates a system implementing an application server including a bridge mechanism according to one embodiment. System 400 may be any of various types of devices, including, but not limited to, a personal computer system, desktop computer, laptop or notebook computer, mainframe computer system, workstation, network computer, or other suitable device. System 400 may include at least one processor 402. The processor 402 may be coupled to a memory 404. Memory 404 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 400 may couple over a network to one or more other devices via one or more wired or wireless network interfaces, such as rich client 412.

System 400 may include, in memory 404, an application server 406 including a bridge mechanism 408 and one or more containers 410. bridge mechanism 408 may allow CORBA-based clients such as rich client 412 to communicate with beans (e.g. EJBs) on one or more containers 410. In one embodiment, containers 410 may be implemented in one or more Java Engines or Java Virtual Machines (JVMs). In one embodiment, rich client 412 may be a CORBA-enabled client, and communications between rich client 412 and application server 406 may be according to the Internet Inter-ORB Protocol (IIOP). In one embodiment, interprocess communication within the application server 406 may be according to the KIVA Communication Protocol (KCP).

Figure 4:
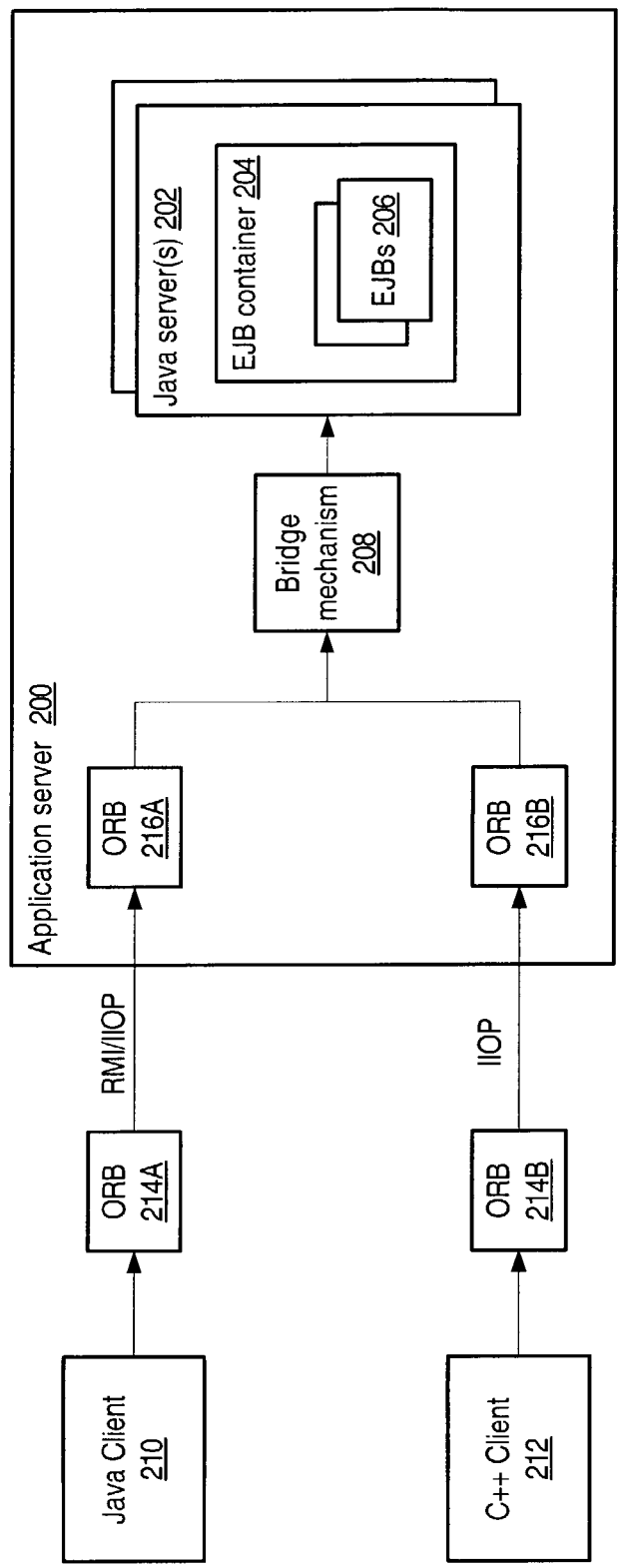
FIG. 4 illustrates a bridge mechanism according to one embodiment.

FIG. 4 illustrates a bridge mechanism according to one embodiment. A bridge mechanism 208 of an Application Server 200 may allow CORBA-based clients such as Java client 210 and C++ client 212 to communicate with beans (e.g. EJBs) 206 hosted on one or more containers 204 (e.g. EJB containers) on one or more Java Servers 202 via the Internet Inter-ORB Protocol (IIOP). Typically, requests are made through a web path where they originate at a Web Browser and are then processed by Java Server Pages (JSPs) and/or servlets, which in turn access EJBs. In one embodiment, this web path uses the HTTP protocol. In the case of CORBA-based clients, requests may be made through the JavaSoft ORB directly to EJBs using bridge mechanism 208, which may also be referred to as a CORBA Executive Server, and which may be an engine (e.g. a Java engine) within the application server 200 which acts as a bridge between CORBA-based clients 210 and 212 and EJBs 206.

In one embodiment, CORBA clients may use a CORBA Common Object Services (COS) Naming Service to resolve EJBHome objects. The CORBA COS Naming Service stores relationships between names and Objects, is itself a CORBA object, and allows hierarchical name spaces. As EJBs are deployed to the application server, the EJBs may be automatically and dynamically registered in the naming service.

As new IIOP requests arrive at an instance of an application server, the application server load balances these requests against one or more JVMs acting as EJB containers. Load balancing may be implemented in a round-robin scheme. Upon startup, the application server obtains a list of the available EJB container processes, also referred to as Java Engines. As home lookup requests arrive from CORBA clients, the application server uses a list of engines to select the target engine on which an EJB home is hosted. Subsequent lookups for that EJB home, bean creations on that home, and business method invocations on the created beans go to the same target engine.

Figure 5:
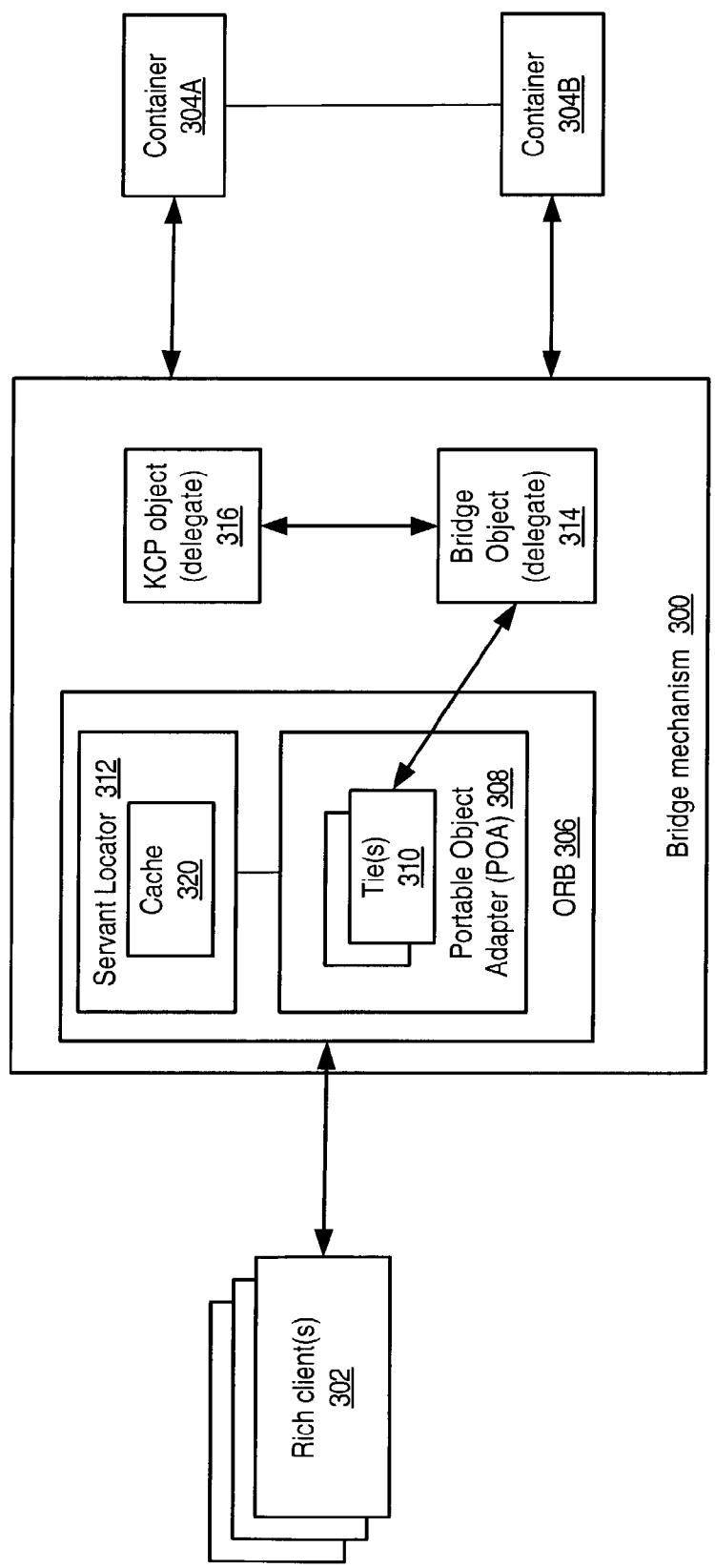
FIG. 5 illustrates a bridge implemented in an application server according to one embodiment.

FIG. 5 illustrates a bridge implemented in an application server according to one embodiment. This figure illustrates an embodiment of a mechanism used to provide support for RMI over IIOP communication for deployed beans. In one embodiment, the application server may have a proprietary interprocess communication protocol based on Kivasoft, the KIVA Communication Protocol (KCP). Other embodiments may use other proprietary or non-proprietary interprocess communication protocols. One or more concurrent rich clients 302 connect to the bridge mechanism 300 when looking up and invoking operations over the deployed beans. An application server provides one or more Java server engines that provide container 304 implementations for beans (e.g. EJB beans). In one embodiment, the bridge 300 uses the Tie CORBA object implementation mechanism to provide RMI over IIOP support. In one embodiment, the Tie CORBA object(s) 310 delegate calls to intermediate bridge object implementation(s) 314 which in turn delegate the calls to KCP objects 316 that use a proprietary communication protocol to communicate with the bean objects created on the container(s) 304. Note that in other embodiments, the delegate objects 316 may use other communication protocols.

In one embodiment, as per the CORBA standard, the bridge mechanism 300 may include an object request broker (ORB) 306. In this embodiment, CORBA objects created in bridge mechanism 300 may be created using ORB support. ORB holds references that are CORBA objects. In rich client 302 access, unlike web-based access, a rich client 302 has standalone code (e.g. Java, C++, etc) that accesses containers 304 through the bridge mechanism 300. In one embodiment, an interface may be provided by the bridge mechanism 300 that looks up beans for rich clients 302 on the containers 304 using a naming service to try to obtain an EJB object deployed in a container on the application server. During this process, a call from a rich client 302 goes to the bridge mechanism 300, and the call then is directed or delegated to a container in the application server. The rich client 302 call is translated into a CORBA object based on RMI/IIOP.

In one embodiment, bridge mechanism 300 may include a POA (Portable Object Adapter) 308 which is supported by a servant manager (e.g. servant locator 312). In one embodiment, a lookup service is a naming service provided by the operating system. In one embodiment, servant locator 312 is a subcomponent of the POA 308. In one embodiment, when the bridge mechanism 300 receives a call, it looks up a POA 308 which includes CORBA objects (Ties 310) that were previously looked up and that represent or reference beans on containers. In one embodiment, Ties 310 may be stored in a cache 320. In one embodiment, Ties 310 may be stored in cache 320 according to hashes of object identifiers (OIDs). When a naming service lookup is performed, objects that are looked up from the containers 304 and routed through the bridge are cached into the POA subsystem. Whenever an Internet access provider (IAP) call comes in to the bridge 300 from a rich client, the call includes an Input/Output reference that includes a key indicating the target POA 308. There may be one or more POAs 308 in ORB 306. The POA 308 is called, and in response the POA 308 invokes the CORBA servant manager (servant locator 312).

The first time a call is received, for example when a lookup is performed, the call is routed to a POA 308, which invokes the servant locator 312 to instantiate the reference indicated by a call (bean). The servant manager creates intermediate objects (bridge objects 314), which uses a KIVA Communication Protocol (KCP) delegate object 316. A KCP delegate object 316 is a transport-defined protocol object that may be proprietary to the application server. Protocols of calls to the bridge object 314 are based on the IAP (Internet access provider) protocol. A call is dedicated to a KCP object 316 by the bridge object 314. The KCP object 316 is a task-specific delegate object, which forwards the call to the appropriate container 304. In the container 304, a bean object (e.g. an EJB bean object) will be created and the call will be invoked into its remote interface.

In one embodiment, an application server that is not CORBA-enabled may support CORBA-enabled applications (e.g. rich clients) through a bridge mechanism that creates wrapper (CORBA) objects. In one embodiment, interprocess communication on the application server is based on the KIVA Communication Protocol (KCP). This bridge mechanism communicates with a container process that supports RMI objects. When a CORBA client (e.g. rich client) communicates with the bridge mechanism using the IIOP protocol to access RMI objects on a container, the communication process may be referred to as RMI/IIOP because calls from the rich client target RMI objects on the container, and access to the RMI objects on the container is enabled through an IIOP mechanism provided by the bridge mechanism.

A call from a rich client to the bridge mechanism may be referred to as an RMI/IIOP call. The call from the rich client is translated by the bridge mechanism to a container that includes target RMI objects (e.g. beans) through a delegate object. In one embodiment, the delegate objects are KCP objects.

The RMI objects provide RMI remote interfaces. The bridge mechanism creates delegates for the RMI objects referred to as CORBA bridge objects (delegates). These objects are exposed to CORBA (rich) clients using the CORBA Tie objects. In one embodiment, the bridge objects are wrapped around the CORBA objects using Tie objects. A Tie object is a CORBA object or servant that is managed by a servant locator. CORBA objects in a bridge mechanism may be designed on a pure CORBA interface or alternatively may be designed as a Tie-based interface.

When using the Tie-based interface, calls from a rich client to the bridge mechanism may go to a Tie object that uses a delegate to pass on the call to an intermediate delegate object (bridge object). In one embodiment, when a call comes in, the bridge mechanism passes the call to a servant locator. The servant locator creates a hash of the CORBA object ID and uses the hash to look up the Tie object in a cache. The servant locator creates a bridge object and sets the bridge object as a target (delegate) object in the Tie object. The Tie object references the bridge object, and the bridge object accesses the actual bean (e.g. EJB bean) on a container through a delegate (e.g. KCP) object.

Scalability is an important aspect of an application server supporting rich clients using a bridge mechanism to support RMI over IIOP invocations for deployed beans. Embodiments of a bridge mechanism may include one or more mechanisms for, among other purposes, increasing scalability of bridge mechanisms. These mechanisms may include one or more of mechanisms for managing Portable Object Adapter (POA)-generated object identifiers (OIDs), post-invoke mechanisms, mechanisms for unexporting portable remote objects used as delegates in a Tie-based CORBA object implementation, and mechanisms for bridge mechanism management of internal cache used for housekeeping rich clients.

Management of POA-Generated OIDs

In one embodiment, a bridge mechanism maintains a cache of CORBA references (Tie objects). The key used for hashing in the cache is the object identifier (OID) provided by the ORB. OID representation is in the form of a byte array. In one embodiment, the bridge mechanism converts these byte array representations to another form for use in hashing. In one embodiment, the bridge mechanism may include a servant locator that performs the conversion. One way to do the conversion is to convert the byte array to string form, e.g. using String(byte[ ]), and use this string value to cache the elements. A problem associated with this approach is that, as the OIDs generated by ORB become greater than 128 integer value (4 byte array), the string representation does not map to a valid character in the ASCII encoding set, since there are only 128 distinct ASCII values. Thus, associated CORBA references in the cache may be overwritten for these OIDs. This may result in CORBA references to different bean types being overwritten. In this case, a rich client call to CORBA reference may be dispatched to an object exposing a different interface, resulting in an error condition. This limits scalability of rich client support.

In one embodiment, to provide increased scalability, the bridge mechanism first obtains the integer value of the 4 byte OID, and then converts the obtained integer value to its string representation, thereby maintaining the uniqueness of the OIDs in the internal cache and preventing overwriting of cached CORBA references. In one embodiment, this conversion uses the left shift mechanism to generate a composite integer value (e.g. a 4 byte value). In one embodiment, the most significant byte (MSB) is the fourth byte of the 4-byte OID, and the least significant byte (LSB) is the first byte of the OID, and left shift is used to generate a 32-bit integer value equivalent of the 4-byte array. The integer value may then be converted into a string object. In one embodiment, the conversion may be performed by a servant locator subprocess of the bridge mechanism. By converting the OID to an integer value and then a string, a unique hash value for every OID may be generated.

Figure 6:
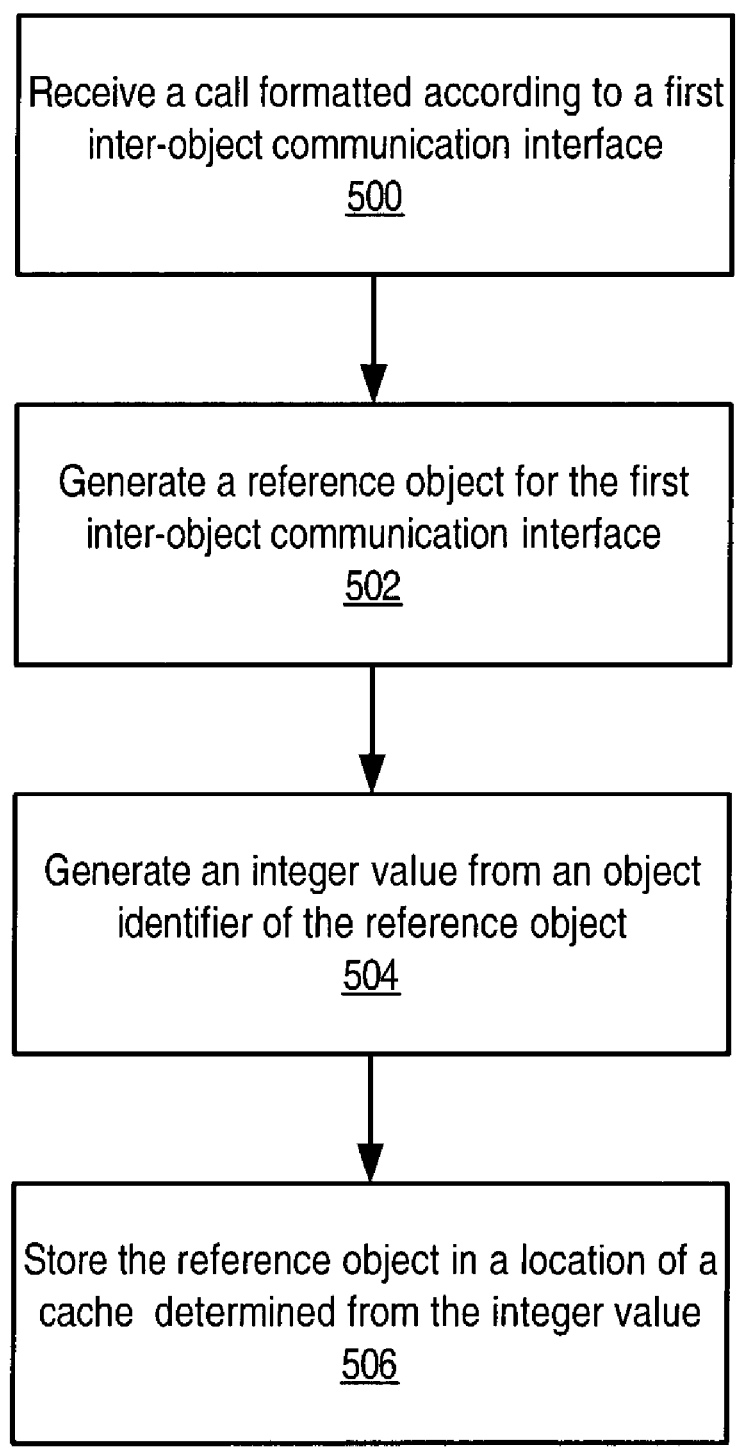
FIG. 6 is a flowchart illustrating using the object identifier of a reference object to store the object in a cache according to one embodiment.

FIG. 6 is a flowchart illustrating using the object identifier of a reference object to store the object in a cache according to one embodiment. As indicated at 500, a bridge mechanism configured to serve as a bridge between inter-object communication interfaces such as IIOP and RMI objects may receive a call formatted according to a first inter-object communication interface. The call may indicate an object (e.g. bean) stored on a container (e.g. EJB container) of the application server. The call may be received from an application configured for inter-object communication according to the first inter-object communication interface. In one embodiment, the application may be a CORBA application. In one embodiment, the application may be a CORBA rich client.

As indicated at 502, the bridge mechanism may generate a reference object configured to provide the call to an object configured for inter-object communication according to a second inter-object communication interface. In one embodiment, the reference object is a CORBA object. In one embodiment, the reference object is a CORBA wrapper object. In one embodiment, the bridge mechanism is a component of an application server configured to host a plurality of objects configured for inter-object communication according to the second inter-object communication interface. In one embodiment, the plurality of objects is stored on one or more containers of the application server. In one embodiment, the plurality of objects are Java beans. In one embodiment, the beans are EJB beans. In one embodiment, the first inter-object communication interface is Internet Inter-ORB Protocol (IIOP), and the second inter-object communication interface is Remote Method Interface (RMI).

As indicated at 504, the bridge mechanism may generate an integer value from an object identifier (OID) of the reference object. In one embodiment, the object identifier is a 4-byte array. In one embodiment, the bridge mechanism may use a left-shift mechanism to generate the integer value from the OID.

As indicated at 506, the bridge mechanism may store the reference object in a location of an internal cache determined from the integer value. In one embodiment, the bridge mechanism may generate a string representing the integer value and store the reference object in the location of the cache indicated by the generated string.

Post-Invoke Implementation

The servant locator maintains an internal cache of objects previously requested by rich clients and stored in accordance with hashes of the OIDs of the objects. If an object is being located, or if a new object is being created, the object is added to the cache. For example, when a lookup is performed on behalf of a rich client through the name service, the call goes to the servant locator. The servant locator maintains an internal cache. The object that is returned by the servant locator is also stored in the cache using a hash generated from its OID. If another lookup call is received for the object, the servant locator checks to see if the requested object is in the cache. If the servant locator finds the object in the cache, it does not have to create the object, but instead returns the OID reference (the CORBA reference) of the object from the cache to the requesting rich client.

As an example of using the cache, the first time a rich client tries to look an object (e.g. bean, the servant locator may not find the object in the cache. If the object is not fin the cache, the servant locator creates an instance of the object and caches the object. If another rich client tries to access the same object, the servant locator checks to see if the object is in the cache. If it is in the cache, the servant locator returns the object from the cache. The cache is maintained at the bridge mechanism; if any client looks up the same object that is still in the cache, the call is returned referencing the object in the cache. Thus, the call does not need to propagate to the EJB container.

The cache may be limited in size. In one embodiment, to maintain boundary conditions of the cache, objects may be marked for delete and, if the cache becomes full or overflows, all objects marked for deletion may be purged. In one embodiment, whenever the boundary condition of the cache is reached, there is a cleanup mechanism that checks for entries marked for deletion. If an entry is marked for deletion, the object is purged from the cache.

In the bridge mechanism, the servant locator interface provides a pre-invoke and a post-invoke operation. RMI/IIOP calls from rich clients to the bridge mechanism go to a POA object of the bridge. The POA object sends the calls to a servant locator to get CORBA objects (delegates) to call the target objects (beans). The calls sent to the servant locator go to the pre-invoke mechanism, and, after pre-invoke finishes, the actual remote objects on containers are called. For example, if the POA receives a remove call from a rich client, the POA gives it to the servant locator. The servant locator calls the pre-invoke, and then, after completion of the pre-invoke, it forwards the call to the target object, i.e. the call is propagated to the container. Once the call to the final target object completes, and before the call is returned to the client, the post-invoke mechanism of the servant locator is invoked by the POA. The post-invoke marks the completion of the call to the target object in the container.

In one embodiment of the post-invoke method of the servant locator, all invocations of CORBA references of objects (e.g. EJBHome and EJBObject objects) would result in the reference being marked for deletion from the cache by the post-invoke. If cache overflow occurs, all marked for delete entries are removed from the cache. This would result in the CORBA references for the objects marked for deletion being purged from the cache. If a client is not done with an object, and thus does not invoke the remove method for the object, the object may still be removed from the cache by the post-invoke method. In this embodiment, if a rich client holding a reference to an object that has been purged from the cache later invokes a method, for example create, that references the purged object, the servant locator is not able to find the reference in the cache, potentially resulting in failure of the RMI/IIOP call.

In another embodiment, to avoid failures of RMI/IIOP calls due to objects being removed from the cache, rich clients invoke the remove method when done using an object to mark the objects for deletion from the cache. The post-invoke mechanism does not mark objects for deletion at the completion of any invocation; objects are only marked for deletion in response to remove calls from the rich clients. The post-invoke method determines if an operation invoked on a CORBA reference is a remove operation and, if so, marks the object for deletion from the cache. When an invocation is performed on a CORBA object as per a call from a rich client, the OID and the method being invoked on that OID are provided in the call. The post-invoke mechanism uses that information to determine if the call is a remove call. If the call is a remove call, the rich client has called for deletion of the target object from the container, and the object is also marked for deletion from the servant locator cache.

Thus, in this embodiment, objects are not marked for deletion from the cache until the rich client has actually called the remove method. In one embodiment, the rich clients are required to call the remove method when done with an object. Requiring the rich clients to call the remove method when done with an object may help prevent the cache from potentially growing beyond boundary conditions. When post-invoke is called, it checks to see if the call is a remove method. If it a remove call, post-invoke marks the object for deletion from the cache. If the call is not a remove call, the object is not marked for deletion from the cache.

Figure 7:
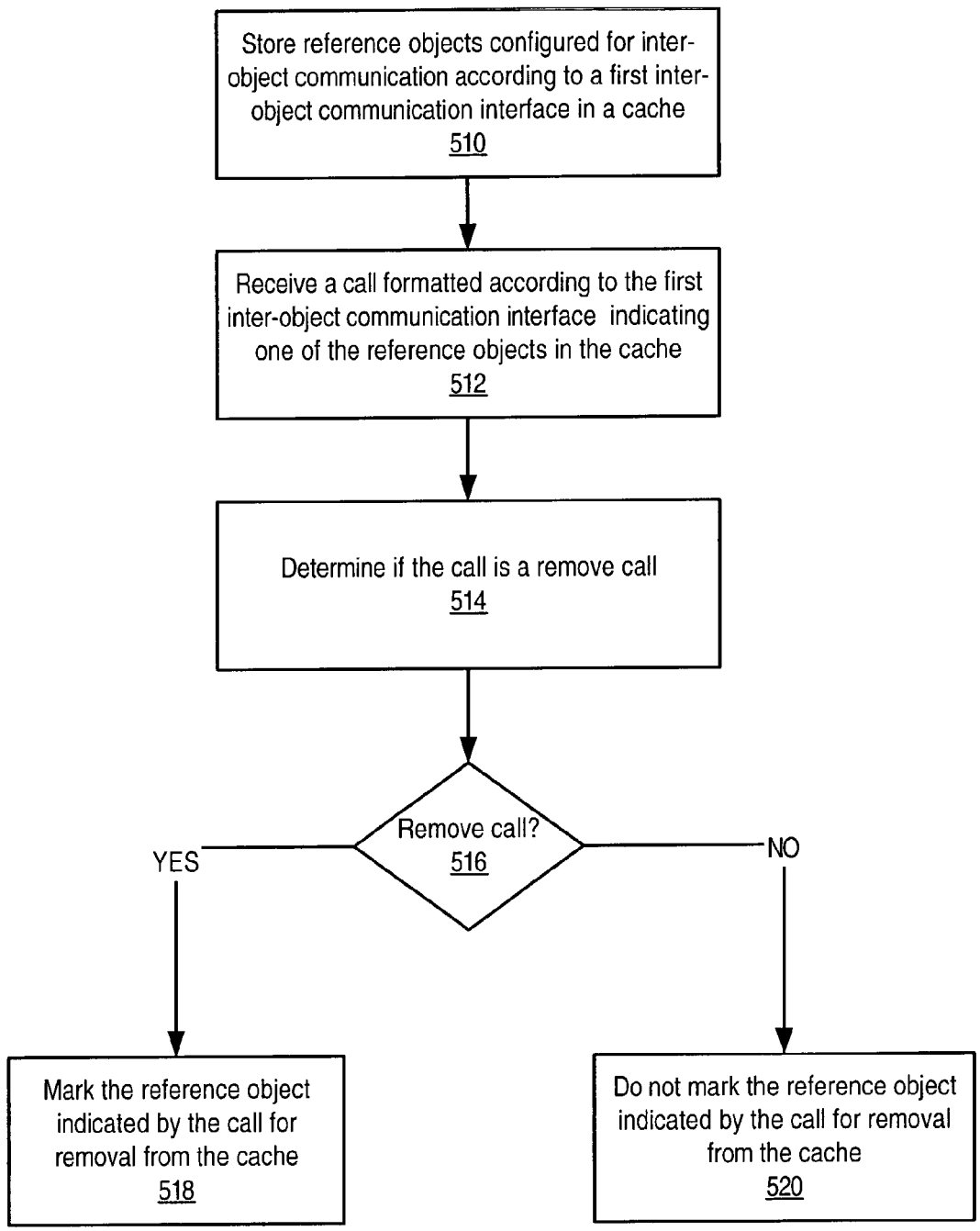
FIG. 7 is a flowchart illustrating a method of marking reference objects for removal from a cache according to one embodiment.

FIG. 7 is a flowchart illustrating a method of marking reference objects for removal from a cache according to one embodiment. As indicated at 510, a bridge mechanism may store reference objects configured for inter-object communication according to a first inter-object communication interface in a cache. In one embodiment, the reference objects are each configured to provide calls to one of a plurality of objects configured for inter-object communication according to a second inter-object communication interface. In one embodiment, the first inter-object communication interface is Internet Inter-ORB Protocol (IIOP), and the second inter-object communication interface is Remote Method Interface (RMI). In one embodiment, the bridge mechanism is a component of an application server configured to host a plurality of objects configured for inter-object communication according to the second inter-object communication interface. In one embodiment, the objects configured for inter-object communication according to the second inter-object communication interface are Java beans. In one embodiment, the objects are EJB beans. In one embodiment, the reference objects provide CORBA interfaces to RMI objects (e.g. beans) stored on one or more containers of an application server.

As indicated at 512, the bridge mechanism may receive a call formatted according to the first inter-object communication interface and indicating one of the reference objects stored in the cache. In one embodiment, the call may be received from an application configured for inter-object communication according to the first inter-object communication interface. In one embodiment, the application may be a Common Object Request Broker Architecture (CORBA) rich client.

As indicated at 514, the bridge mechanism may determine if the call is a remove call. As indicated at 516, if the call is a remove call, the reference object indicated by the call may be marked for removal from the cache as indicated at 518. As indicated at 520, if the call is not a remove call, the reference object indicated by the IIOP call is not marked for removal from the cache.

Note that, in one embodiment, rich clients may be required to call the remove method when done with an object to help prevent memory problems on the application server. This method of only marking objects for removal from the cache when receiving a remove call from a rich client may preferably help prevent the failure of IIOP calls received from rich clients due to objects being purged from the cache prematurely due to the objects being marked for deletion on every invocation of CORBA references of objects by post-invoke.

Unexporting of Portable Remote Objects

The containers host RMI objects. These RMI objects are RMI remote portable objects. The bridge objects generated on the bridge mechanism extend from RMI portable remote objects. The bridge objects are RMI-enabled objects that implement the RMI portable remote object class. When a call (e.g. lookup or create) is being done for an object (e.g. EJBHome or EJBObject objects), on the bridge mechanism, the TIE instantiates an RMI portable remote object as a bridge object. When an RMI portable remote object is created, it is exported to be available for clients to lookup. To insure that an RMI portable remote objects is garbage collected, unexport must be called on these objects to indicate to the JVM that the client is done with the object and thus it should be garbage collected. If unexport is not done on RMI portable remote objects, memory may be wasted.

The servant locator of the bridge mechanism performs pre-invoke, call to object, and post-invoke when it receives a call. When the post-invoke mechanism is called, one of the parameters is a CORBA reference (e.g. Tie object). This CORBA reference object internally has a reference to the bridge object. Whenever a remove takes place, it may be desirable to insure that whenever a CORBA reference object (Tie) is deleted, the bridge object also is garbage collected by the JVM.

In one embodiment, when a rich client invokes the remove method on a CORBA reference to an object (e.g. an EJBObject), unexport is called on the target of the CORBA reference (in one embodiment, a Tie object). In one embodiment, the target of the CORBA reference is set to null by the unexport mechanism. In this embodiment, upon completion of a remove invocation and before the post-invoke method is invoked, the target of the CORBA reference is already set to null. The CORBA reference is one of the passed parameters to the post-invoke mechanism of the servant locator, and the post-invoke mechanism may need to access the target of the CORBA reference. This could potentially result in errors being generated and reported to the rich clients.

In another embodiment, to insure that the target of the CORBA reference is available to the post-invoke mechanism, unexport is not performed as part of the remove method implementation of the bridge mechanism. Upon invocation of post-invoke method by the ORB, after the remove method returns, the servant locator removes the cached reference by marking it for deletion. In one embodiment, the post invoke implementation ensures removal of the CORBA reference by marking it for deletion from cache and carries out unexporting of the bridge object, which is the portable remote object. During removal from the cache, the target of the CORBA reference (e.g. Tie) is set to null, thus ensuring that all the associated object references (related to the invocation object) held by the bridge mechanism, CORBA objects and their targets, are removed. In one embodiment, during removal, only the Tie's target is set to null to dereference that bridge object and cause the chain of delegate objects in the bridge process to be removed from memory. In one embodiment, unexport is performed as part of post invoke implementation.

In this embodiment, the post-invoke mechanism checks objects it receives upon invocation and, if it determines an object is an RMI portable remote object (e.g. a bridge object), performs unexport on the object.

In this embodiment, the remove method does not unexport RMI portable remote objects. Instead, the RMI portable remote objects are unexported by the post-invoke mechanism. This ensures that the targets of CORBA references are available to the post-invoke mechanism. In one embodiment, this may only be performed for bridge objects that are targets of CORBA references (e.g. Tie objects). During post-invoke, the CORBA reference object is nullified and the bridge object referenced by the CORBA reference object is unexported. In one embodiment, nullification of the CORBA reference object may be accomplished by ensuring that the objects are marked for deletion so that the cache management mechanism can detect the marked objects and remove them from the cache. When the unexport is performed by the post invoke, it ensures that the RMI portable remote object is dereferenced and will be garbage collected. If unexport is not called, the JVM is not able to release the object which may result in memory problems.

In one embodiment, as part of the cache management of the servant locator, the target of the CORBA reference (e.g. Tie) being removed is set to null. This ensures that the target object (an RMI portable remote object) is dereferenced, thereby making it eligible for garbage collection by the JVM. Cache clearance takes place during life cycle management of the cache. When the cache gets cleared (i.e. objects marked for delete are purged), a check is performed to determine if each object being deleted has a target that is an RMI portable remote object. If it is an RMI portable remote object, the target (previously unexported by post invoke) is set to NULL.

Instead of unexporting RMI portable remote objects as part of the remove, unexport is performed later after the remove has returned by post-invoke. The servant locator keeps track of objects that have been removed and marks them for deletion. In one embodiment, this applies to removing bridge objects, which are RMI portable remote objects. In one embodiment, Tie objects in the cache are removed as part of cache management when the cache reaches its maximum size.

Figure 8:
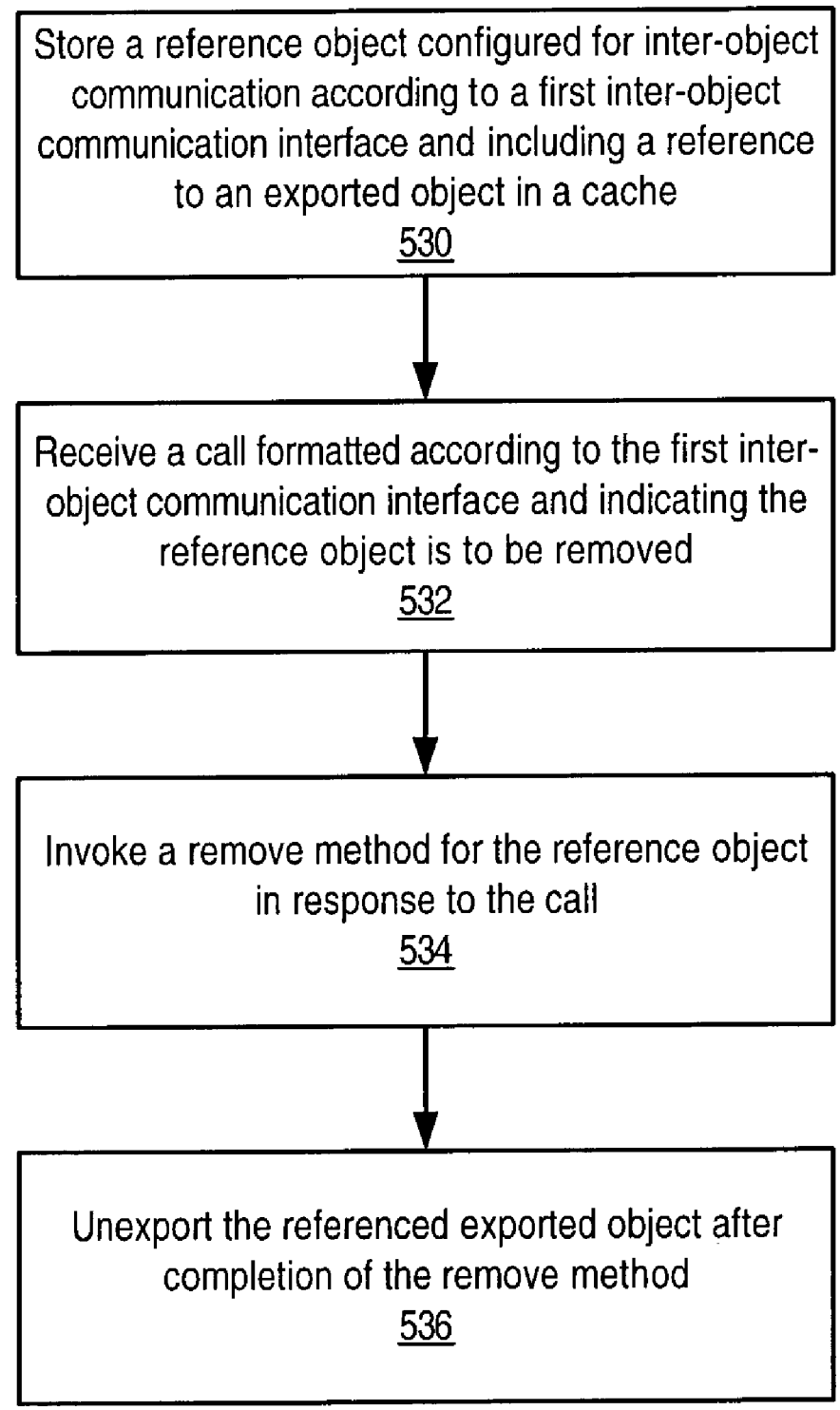
FIG. 8 is a flowchart illustrating a method of unexporting exported objects according to one embodiment.

FIG. 8 is a flowchart illustrating a method of unexporting exported objects according to one embodiment. As indicated at 530, a bridge mechanism may store a reference object configured for inter-object communication according to a first inter-object communication interface in a cache. In one embodiment, the reference object is configured to provide a call to an object configured for inter-object communication according to a second inter-object communication interface. In one embodiment, the first inter-object communication interface is Internet Inter-ORB Protocol (IIOP), and the second inter-object communication interface is Remote Method Interface (RMI). In one embodiment, the reference object provides a CORBA interface to an RMI object stored on a container coupled to the bridge mechanism. In one embodiment, the bridge mechanism is a component of an application server configured to host a plurality of objects configured for inter-object communication according to the second inter-object communication interface. In one embodiment, the objects configured for inter-object communication according to the second inter-object communication interface are Java beans. In one embodiment, the objects are EJB beans.

In one embodiment, the reference object includes a reference to an exported object. As indicated at 532, the bridge mechanism may receive a call (e.g. from a rich client) formatted according to the first inter-object communication interface and indicating the reference object is to be removed. In one embodiment, the call may be received from an application configured for inter-object communication according to the first inter-object communication interface. In one embodiment, the application may be a Common Object Request Broker Architecture (CORBA) rich client. As indicated at 534, the bridge mechanism may invoke a remove method for the reference object in response to the call. In one embodiment, the remove method does not unexport the referenced exported object. Instead, after completion of the remove method, the bridge mechanism may unexport the referenced exported object as indicated at 536.

In one embodiment, the bridge mechanism may invoke a post-invoke mechanism after completion of the remove method, and the post-invoke mechanism may perform the unexport of the referenced exported object. In one embodiment, the post-invoke mechanism may be provided as an interface to the servant locator. Performing the unexport during post-invoke rather than during the remove method preferably helps prevent errors generated by nulling references to exported objects in the reference objects when the references are needed by the post-invoke mechanism. In one embodiment, the bridge mechanism may set the reference to the exported object in the reference object to null and also may remove the reference object from the cache or alternatively mark the reference object for removal from the cache by a cache management process.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    a bridge mechanism component of an application server receiving a call from a client formatted according to a first inter-object communication interface;
    generating a reference object for the first inter-object communication interface and configured to provide the call to an object configured for inter-object communication according to a second inter-object communication interface;
    generating an integer value from an object identifier of the reference object; and
    storing the reference object in a location of a cache determined from the integer value;
    wherein said receiving, said generating a reference object, said generating an integer value, and said storing are all performed by the bridge mechanism component, wherein the bridge mechanism component provides communications between applications configured for inter-object communication according to the first inter-object communication interface and objects configured for inter-object communication according to the second inter-object communication interface.

2. The computer-implemented method as recited in 1, wherein the application server is configured to host a plurality of objects configured for inter-object communication according to the second inter-object communication interface.

3. The computer-implemented method as recited in claim 1, wherein the plurality of objects is stored on one or more containers of the application server.

4. The computer-implemented method as recited in claim 1, wherein the call is received from an application configured for inter-object communication according to the first inter-object communication interface.

5. The computer-implemented method as recited in claim 4, wherein the application is a rich client.

6. The computer-implemented method as recited in claim 4, wherein the application is a Common Object Request Broker Architecture (CORBA) application.

7. The computer-implemented method as recited in claim 1, wherein the call indicates the object configured for inter-object communication according to the second inter-object communication interface.

8. The computer-implemented method as recited in claim 1, wherein the call is an Internet Inter-ORB Protocol (IIOP) call.

9. The computer-implemented method as recited in claim 1, wherein the second inter-object communication interface is Remote Method Interface (RMI).

10. The computer-implemented method as recited in claim 1, wherein the object configured for inter-object communication according to a second inter-object communication interface is a Java bean.

11. The computer-implemented method as recited in claim 1, wherein said storing the reference object in a location of a cache determined from the integer value comprises: generating a string representing the integer value; and storing the reference object in the location of the cache indicated by the string.

12. The computer-implemented method as recited in claim 1, wherein the reference object is a CORBA wrapper object.

13. The computer-implemented method as recited in claim 1, further comprising:
    receiving a subsequent call formatted according to the first inter-object communication interface;
    determining if the subsequent call is a remove call for the reference object;
    if the subsequent call is a remove call, marking the reference object for removal from the cache; and
    if the subsequent call is not a remove call, not marking the reference object for removal from the cache.

14. The computer-implemented method as recited in claim 1, wherein the reference object includes a reference to an exported object, the method further comprising:
    receiving a remove call formatted according to the first inter-object communication interface, wherein the remove call indicates the reference object is to be removed;
    invoking a remove method for the reference object in response to the remove call; and
    unexporting the referenced exported object after completion of the remove method.

15. The computer-implemented method as recited in claim 14, wherein said unexporting the referenced exported object after completion of the remove method comprises:
    invoking a post-invoke mechanism after completion of the remove method; and
    the post-invoke mechanism unexporting the referenced exported object.

16. The computer-implemented method as recited in claim 14, wherein the exported object is a Remote Method Invocation (RMI) portable remote object.

17. The computer-implemented method as recited in claim 14, further comprising:
    setting the reference to the exported object in the reference object to null; and
    removing the reference object from the cache.

18. A computer-implemented method, comprising:
    storing one or more reference objects configured for inter-object communication according to a first inter-object communication interface in a cache, wherein the reference objects are each configured to provide calls to one of a plurality of objects configured for inter-object communication according to a second inter-object communication interface;
    receiving a call formatted according to the first inter-object communication interface and indicating one of the reference objects stored in the cache;
    determining if the call is a remove call for the one of the reference objects;
    if the call is a remove call, marking the reference object indicated by the call for removal from the cache; and
    if the call is not a remove call, not marking the reference object indicated by the call for removal from the cache;
    wherein said storing, said receiving, said determining and said marking are performed by a bridge mechanism configured to provide communications between applications configured for inter-object communication according to the first inter-object communication interface and objects configured for inter-object communication according to the second inter-object communication interface.

19. The computer-implemented method as recited in claim 18, wherein the reference object includes a reference to an exported object, the method further comprising, if the call is a remove call:

invoking a remove method for the reference object; and
unexporting the referenced exported object after completion of the remove method.

20. The computer-implemented method as recited in claim 19, wherein said unexporting the referenced exported object after completion of the remove method comprises:
   invoking a post-invoke mechanism after completion of the remove method; and
   the post-invoke mechanism unexporting the referenced object.

21. The computer-implemented method as recited in claim 19, further comprising:
   setting the reference to the exported object in the reference object to null; and
   removing the reference object from the cache.

22. The computer-implemented method as recited in claim 18, wherein the bridge mechanism is a component of an application server configured to host the plurality of objects configured for inter-object communication according to the second inter-object communication interface.

23. The computer-implemented method as recited in claim 18, wherein the call is received from an application configured for inter-object communication according to the first inter-object communication interface.

24. The computer-implemented method as recited in claim 23, wherein the application is a Common Object Request Broker Architecture (CORBA) rich client.

25. The computer-implemented method as recited in claim 18, wherein the first inter-object communication interface is Internet Inter-ORB Protocol (IIOP), and wherein the second inter-object communication interface is Remote Method Interface (RMI).

26. The computer-implemented method as recited in claim 18, wherein the plurality of objects configured for inter-object communication according to the second inter-object communication interface are Java beans.

27. A computer-implemented method, comprising:
   storing a reference object configured for inter-object communication according to a first inter-object communication interface in a cache, wherein the reference object is configured to provide a call to an object configured for inter-object communication according to a second inter-object communication interface, and wherein the reference object includes a reference to an exported object;
   receiving a call formatted according to the first inter-object communication interface and indicating the reference object is to be removed;
   invoking a remove method for the reference object in response to the call; and
   unexporting the referenced exported object after completion of the remove method;
   wherein said storing, said receiving, said invoking, and said unexporting are performed by a bridge mechanism configured to provide communications between applications configured for inter-object communication according to the first inter-object communication interface and objects configured for inter-object communication according to the second inter-object communication interface.

28. The computer-implemented method as recited in claim 27, wherein said unexporting the referenced exported object after completion of the remove method comprises:
   invoking a post-invoke mechanism after completion of the remove method; and
   the post-invoke mechanism unexporting the referenced object.

29. The computer-implemented method as recited in claim 27, further comprising:
   setting the reference to the exported object in the reference object to null; and
   removing the referenced object from the cache.

30. The computer-implemented method as recited in claim 27, wherein the bridge mechanism is a component of an application server is configured to host a plurality of objects configured for inter-object communication according to the second inter-object communication interface.

31. The computer-implemented method as recited in claim 27, wherein the object configured for inter-object communication according to the second inter-object communication interface is a Java bean.

32. The computer-implemented method as recited in claim 27, wherein the call is received from an application configured for inter-object communication according to the first inter-object communication interface.

33. The computer-implemented method as recited in claim 32, wherein the application is a Common Object Request Broker Architecture (CORBA) rich client.

34. The computer-implemented method as recited in claim 27, wherein the first inter-object communication interface is Internet Inter-ORB Protocol (IIOP), and wherein the second inter-object communication interface is Remote Method Interface (RMI).

35. A system comprising:
   a processor; and
   a memory comprising program instructions, wherein the program instructions are executable by the processor to implement a bridge mechanism component of an application server configured to:
      receive a call from a client formatted according to a first inter-object communication interface;
      generate a reference object for the first inter-object communication interface and configured to provide the call to an object configured for inter-object communication according to a second inter-object communication interface;
      generate an integer value from an object identifier of the reference object; and
      store the reference object in a location of a cache determined from the integer value;
   wherein the bridge mechanism component is configured to provide communications between applications configured for inter-object communication according to the first inter-object communication interface and objects configured for inter-object communication according to the second inter-object communication interface.

36. The system as recited in claim 35, wherein the program instructions are further executable by the processor to implement the application server to host a plurality of objects configured for inter-object communication according to the second inter-object communication interface.

37. The system as recited in claim 35, wherein the bridge mechanism is further configured to receive the call from an application configured for inter-object communication according to the first inter-object communication interface.

38. The system as recited in claim 37, wherein the application is a Common Object Request Broker Architecture (CORBA) rich client.

39. The system as recited in claim 35, wherein the call indicates the object configured for inter-object communication according to the second inter-object communication interface.

40. The system as recited in claim 35, wherein the first inter-object communication interface is Internet Inter-ORB Protocol (IIOP), and wherein the second inter-object communication interface is Remote Method Interface (RMI).

41. The system as recited in claim 35, wherein the object configured for inter-object communication according to a second inter-object communication interface is a Java bean.

42. The system as recited in claim 35, wherein, to store the reference object in a location of a cache determined from the integer value, the bridge mechanism is further configured to:
   generate a string representing the integer value; and
   store the reference object in the location of the cache indicated by the string.

43. The system as recited in claim 35, wherein the reference object is a CORBA wrapper object.

44. The system as recited in claim 35, wherein the bridge mechanism is further configured to:
   receive a subsequent call formatted according to the first inter-object communication interface;
   determine if the subsequent call is a remove call for the reference object;
   if the subsequent call is a remove call, mark the reference object for removal from the cache; and
   if the subsequent call is not a remove call, not mark the reference object for removal from the cache.

45. The system as recited in claim 35, wherein the reference object includes a reference to an exported object, and wherein the bridge mechanism is further configured to:
   receive a remove call formatted according to the first inter-object communication interface, wherein the remove call indicates the reference object is to be removed;
   invoke a remove method for the reference object in response to the remove call; and
   unexport the referenced exported object after completion of the remove method.

46. The system as recited in claim 45, wherein, to unexport the referenced exported object after completion of the remove method, the bridge mechanism is further configured to:
   invoke a post-invoke mechanism after completion of the remove method; and
   wherein the post-invoke mechanism is configured to unexport the referenced exported object.

47. The system as recited in claim 45, wherein the referenced exported object is a Remote Method Invocation (RMI) portable remote object.

48. The system as recited in claim 45, wherein the bridge mechanism is further configured to:
   set the reference to the exported object in the reference object to null; and
   remove the reference object from the cache.

49. A system comprising:
   a processor; and
   a memory comprising program instructions, wherein the program instructions are executable by the processor to implement a bridge mechanism configured to:
     store one or more reference objects configured for inter-object communication according to a first inter-object communication interface in a cache, wherein the reference objects are each configured to provide calls to one of a plurality of objects configured for inter-object communication according to a second inter-object communication interface;
     receive a call formatted according to the first inter-object communication interface and indicating one of the reference objects stored in the cache;
     determine if the call is a remove call for the one of the reference objects;
     if the call is a remove call, mark the reference object indicated by the call for removal from the cache; and
     if the call is not a remove call, not mark the reference object indicated by the call for removal from the cache;
   wherein the bridge mechanism is configured to provide communications between applications configured for inter-object communication according to the first inter-object communication interface and objects configured for inter-object communication according to the second inter-object communication interface.

50. The system as recited in claim 49, wherein the reference object includes a reference to an exported object, and wherein the bridge mechanism is further configured to, if the call is a remove call:
   invoke a remove method for the reference object; and
   unexport the referenced exported object after completion of the remove method.

51. The system as recited in claim 50, wherein, to unexport the referenced exported object after completion of the remove method, the bridge mechanism is further configured to:
   invoke a post-invoke mechanism after completion of the remove method; and
   wherein the post-invoke mechanism is configured to unexport the referenced object.

52. The system as recited in claim 50, wherein the bridge mechanism is further configured to:
   set the reference to the exported object in the reference object to null; and
   remove the reference object from the cache.

53. The system as recited in claim 49, wherein the program instructions are further executable by the processor to implement an application server configured to host the plurality of objects configured for inter-object communication according to the second inter-object communication interface, wherein the bridge mechanism is implemented as a component of the application server.

54. The system as recited in claim 49, wherein the bridge mechanism is further configured to receive the call from an application configured for inter-object communication according to the first inter-object communication interface.

55. The system as recited in claim 54, wherein the application is a Common Object Request Broker Architecture (CORBA) rich client.

56. The system as recited in claim 49, wherein the first inter-object communication interface is Internet Inter-ORB Protocol (IIOP), and wherein the second inter-object communication interface is Remote Method Interface (RMI).

57. The system as recited in claim 49, wherein the plurality of objects configured for inter-object communication according to the second inter-object communication interface are Java beans.

58. A system comprising:
   a processor; and
   a memory comprising program instructions, wherein the program instructions are executable by the processor to implement a bridge mechanism configured to:
     store a reference object configured for inter-object communication according to a first inter-object communication interface in a cache, wherein the reference object is configured to provide a call to an object configured for inter-object communication according to a second inter-object communication interface, and wherein the reference object includes a reference to an exported object;
     receive a call formatted according to the first inter-object communication interface and indicating the reference object is to be removed;

invoke a remove method for the reference object in response to the call; and unexport the referenced exported object after completion of the remove method;

wherein the program instructions are further executable by the processor to implement an application server configured to host a plurality of objects configured for inter-object communication according to the second inter-object communication interface, wherein the bridge mechanism is implemented as a component of the application server.

59. The system as recited in claim 58, wherein, to unexport the referenced exported object after completion of the remove method, the bridge mechanism is further configured to:

invoke a post-invoke mechanism after completion of the remove method; and wherein the post-invoke mechanism is configured to unexport the referenced object.

60. The system as recited in claim 58, wherein the bridge mechanism is further configured to:

set the reference to the exported object in the reference object to null; and remove the reference object from the cache.

61. The system as recited in claim 58, wherein the bridge mechanism is configured to provide communications between applications configured for inter-object communication according to the first inter-object communication interface and objects configured for inter-object communication according to the second inter-object communication interface.

62. The system as recited in claim 58, wherein the bridge mechanism is further configured to receive the call from an application configured for inter-object communication according to the first inter-object communication interface.

63. The system as recited in claim 62, wherein the application is a Common Object Request Broker Architecture (CORBA) rich client.

64. The system as recited in claim 58, wherein the object configured for inter-object communication according to the second inter-object communication interface is a Java bean.

65. The system as recited in claim 58, wherein the first inter-object communication interface is Internet Inter-ORB Protocol (IIOP), and wherein the second inter-object communication interface is Remote Method Interface (RMI).

66. A system comprising:

a processor;

a memory coupled to said processor means for caching reference object configured for inter-object communication according to a first inter-object communication interface and configured to provide calls to objects configured for inter-object communication according to a second inter-object communication interface;

means for removing the cached reference objects in response to remove calls formatted according to the first inter-object communication interface; and means for unexporting exported objects reference objects in response to the remove calls and after access of the referenced exported objects by said means for removing cached reference objects is complete;

wherein said means for caching, said means for removing, and said means for unexporting, are performed by a bridge mechanism configured to provide communications between applications configured for inter-object communication according to the first inter-object communication interface and objects configured for inter-object communication according to the second inter-object communication interface.

67. The system as recited in claim 66, wherein the first inter-object communication interface is Internet Inter-ORB Protocol (IIOP), and wherein the second inter-object communication interface is Remote Method Interface (RMI).

68. The system as recited in claim 66, wherein the exported objects are Remote Method Invocation (RMI) portable remote objects.

69. A computer-accessible storage medium comprising program instructions, wherein the program instructions are computer-executable to implement:

a bridge mechanism component of an application server receiving a call from a client formatted according to a first inter-object communication interface;

the bridge mechanism component generating a reference object for the first inter-object communication interface and configured to provide the call to an object configured for inter-object communication according to a second inter-object communication interface;

the bridge mechanism component generating an integer value from an object identifier of the reference object; and the bridge mechanism component storing the reference object in a location of a cache determined from the integer value;

wherein the program instructions are further computer-executable to implement the bridge mechanism component to provide communications between applications configured for inter-object communication according to the first inter-object communication interface and objects configured for inter-object communication according to the second inter-object communication interface.

70. The computer-accessible storage medium as recited in claim 69, wherein the application sewer is configured to host a plurality of objects configured for inter-object communication according to the second inter-object communication interface.

71. The computer-accessible storage medium as recited in claim 69, wherein the call is received from an application configured for inter-object communication according to the first inter-object communication interface.

72. The computer-accessible storage medium as recited in claim 71, wherein the application is a Common Object Request Broker Architecture (CORBA) rich client.

73. The computer-accessible storage medium as recited in claim 69, wherein the first inter-object communication interface is Internet Inter-ORB Protocol (IIOP), and wherein the second inter-object communication interface is Remote Method Interface (RMI).

74. The computer-accessible storage medium as recited in claim 69, wherein the object configured for inter-object communication according to a second inter-object communication interface is a Java bean.

75. The computer-accessible storage medium as recited in claim 69, wherein, in said storing the reference object in a location of a cache determined from the integer value, the program instructions are further computer-executable to implement:

generating a string representing the integer value; and storing the reference object in the location of the cache indicated by the string.

76. The computer-accessible storage medium as recited in claim 69, wherein the reference object is a CORBA wrapper object.

77. The computer-accessible storage medium as recited in claim 69, wherein the program instructions are further computer-executable to implement:
- receiving a subsequent call formatted according to the first inter-object communication interface;
- determining if the subsequent call is a remove call for the reference object;
- if the subsequent call is a remove call, marking the reference object for removal from the cache; and
- if the subsequent call is not a remove call, not marking the reference object for removal from the cache.

78. The computer-accessible storage medium as recited in claim 69, wherein the reference object includes a reference to an exported object, and wherein the program instructions are further computer-executable to implement: receiving a remove call formatted according to the first inter-object communication interface, wherein the remove call indicates the reference object is to be removed; invoking a remove method for the reference object in response to the remove call; and unexporting the referenced exported object after completion of the remove method.

79. The computer-accessible storage medium as recited in claim 78, wherein, in said unexporting the referenced exported object after completion of the remove method, the program instructions are further computer-executable to implement: invoking a post-invoke mechanism after completion of the remove method; and the post-invoke mechanism unexporting the referenced exported object.

80. The computer-accessible storage medium as recited in claim 78, wherein the exported object is a Remote Method Invocation (RMI) portable remote object.

81. A computer-accessible storage medium comprising program instructions, wherein the program instructions are computer-executable to implement:
- storing one or more reference objects configured for inter-object communication according to a first inter-object communication interface in a cache, wherein the reference objects are each configured to provide calls to one of a plurality of objects configured for inter-object communication according to a second inter-object communication interface;
- receiving a call formatted according to the first inter-object communication interface and indicating one of the reference objects stored in the cache;
- determining if the call is a remove call for the one of the reference objects;
- if the call is a remove call, marking the reference object indicated by the call for removal from the cache; and
- if the call is not a remove call, not marking the reference object indicated by the call for removal from the cache;
- wherein the program instructions are further computer-executable to implement a bridge mechanism configured to provide communications between applications configured for inter-object communication according to the first inter-object communication interface and objects configured for inter-object communication according to the second inter-object communication interface, wherein the bridge mechanism is configured to perform said storing, said receiving, said determining and said marking.

82. The computer-accessible storage medium as recited in claim 81, wherein the reference object includes a reference to an exported object, and wherein the program instructions are further computer-executable to implement, if the call is a remove call:
- invoking a remove method for the reference object; and
- unexporting the referenced exported object after completion of the remove method.

83. The computer-accessible storage medium as recited in claim 82, wherein, in said unexporting the referenced exported object after completion of the remove method, the program instructions are farther computer-executable to implement:
- invoking a post-invoke mechanism after completion of the remove method; and
- the post-invoke mechanism unexporting the referenced object.

84. The computer-accessible storage medium as recited in claim 81, wherein the program instructions are further computer-executable to implement:
- setting the reference to the exported object in the reference object to null; and
- removing the reference object from the cache.

85. The computer-accessible storage medium as recited in claim 81, wherein the bridge mechanism is a component of an application server configured to host the plurality of objects configured for inter-object communication according to the second inter-object communication interface.

86. The computer-accessible storage medium as recited in claim 81, wherein the call is received from an application configured for inter-object communication according to the first inter-object communication interface.

87. The computer-accessible storage medium as recited in claim 86, wherein the application is a Common Object Request Broker Architecture (CORBA) rich client.

88. The computer-accessible storage medium as recited in claim 81, wherein the first inter-object communication interface is Internet Inter-ORB Protocol (IIOP), and wherein the second inter-object communication interface is Remote Method Interface (RMI).

89. The computer-accessible storage medium as recited in claim 81, wherein the plurality of objects configured for inter-object communication according to the second inter-object communication interface are Java beans.

90. A computer-accessible storage medium comprising program instructions, wherein the program instructions are computer-executable to implement:
- storing a reference object configured for inter-object communication according to a first inter-object communication interface in a cache, wherein the reference object is configured to provide a call to an object configured for inter-object communication according to a second inter-object communication interface, and wherein the reference object includes a reference to an exported object;
- receiving a call formatted according to the first inter-object communication interface and indicating the reference object is to be removed;
- invoking a remove method for the reference object in response to the call; and
- unexporting the referenced exported object after completion of the remove method;
- wherein the program instructions are further computer-executable to implement a bridge mechanism configured to provide communications between applications configured for inter-object communication according to the first inter-object communication interface and objects configured for inter-object communication according to the second inter-object communication interface, wherein the bridge mechanism is configured to perform said storing, said receiving, said invoking, and said unexporting.

91. The computer-accessible storage medium as recited in claim 90, wherein, in said unexporting the referenced exported object after completion of the remove method, the program instructions are further computer-executable to implement: invoking a post-invoke mechanism after completion of the remove method; and the post-invoke mechanism unexporting the referenced object.

92. The computer-accessible storage medium as recited in claim 90, wherein the program instructions are further computer-executable to implement: setting the reference to the exported object in the reference object to null; and removing the referenced object from the cache.

93. The computer-accessible storage medium as recited in claim 90, wherein the bridge mechanism is a component of an application server configured to host a plurality of objects configured for inter-object communication according to the second inter-object communication interface.

94. The computer-accessible storage medium as recited in claim 90, wherein the object configured for inter-object communication according to the second inter-object communication interface is a Java bean.

95. The computer-accessible storage medium as recited in claim 90, wherein the call is received from an application configured for inter-object communication according to the first inter-object communication interface.

96. The computer-accessible storage medium as recited in claim 95, wherein the application is a Common Object Request Broker Architecture (CORBA) rich client.

97. The computer-accessible storage medium as recited in claim 90, wherein the first inter-object communication interface is Internet Inter-ORB Protocol (IIOP), and wherein the second inter-object communication interface is Remote Method Interface (RMI).

98. A system comprising one or more computer systems each having a processor and a memory storing program instructions, said one or more computer systems are configured to implement:
  an application server comprising a bridge mechanism;
  one or more rich clients configured to couple to the application server;
  wherein the bridge mechanism is configured to:
    receive a call formatted according to a first inter-object communication interface from one of the rich clients;
    generate a reference object for the first inter-object communication interface and configured to provide the call to an object configured for inter-object communication according to a second inter-object communication interface;
    generate an integer value from an object identifier of the reference object; and
    store the reference object in a location of a cache determined from the integer value;
  wherein the bridge mechanism component is further configured to provide communications between applications configured for inter-object communication according to the first inter-object communication interface and objects configured for inter-object communication according to the second inter-object communication interface.

99. The system as recited in claim 98, wherein the rich clients are Common Object Request Broker Architecture (CORBA) rich clients.

100. The system as recited in claim 98, wherein the first inter-object communication interface is Internet Inter-ORB Protocol (IIOP), and wherein the second inter-object communication interface is Remote Method Interface (RMI).

101. The system as recited in claim 98, wherein the object configured for inter-object communication according to a second inter-object communication interface is a Java bean.

102. The system as recited in claim 98, wherein, to store the reference object in a location of a cache determined from the integer value, the bridge mechanism is further configured to:
  generate a string representing the integer value; and
  store the reference object in the location of the cache indicated by the string.

103. The system as recited in claim 98, wherein the bridge mechanism is further configured to:
  receive a subsequent call formatted according to the first inter-object communication interface from the one of the rich clients;
  determine if the subsequent call is a remove call for the reference object;
  if the subsequent call is a remove call, mark the reference object for removal from the cache; and
  if the subsequent call is not a remove call, not mark the reference object for removal from the cache.

104. The system as recited in claim 98, wherein the reference object includes a reference to an exported object, and wherein the bridge mechanism is further configured to:
  receive a remove call formatted according to the first inter-object communication interface from the one of the rich clients, wherein the remove call indicates the reference object is to be removed;
  invoke a remove method for the reference object in response to the remove call; invoke a post-invoke mechanism after completion of the remove method, wherein the post-invoke mechanism is configured to un export the referenced exported object.

105. The system as recited in claim 104, wherein the referenced exported object is a Remote Method Invocation (RMI) portable remote object.

* * * * *